United States Patent
Bhat et al.

(10) Patent No.: US 12,531,824 B1
(45) Date of Patent: Jan. 20, 2026

(54) METHOD AND SYSTEM FOR INCORPORATING DYNAMIC DATA ATTRIBUTES IN SCALABLE EMAIL COMMUNICATIONS

(71) Applicant: Morgan Stanley Services Group inc., New York, NY (US)

(72) Inventors: Vishal Bhat, Edison, NJ (US); Jimish Mody, Lutz, FL (US); Dibya Behara, Alpharetta, GA (US); Balanatha Giri Senthilvel Ayyasamy Palanivel, Alpharetta, GA (US); Kelsey Cadagin, Hoboken, NJ (US); Aastha Singh, Hoboken, NJ (US); Radhika Kalla, Bengaluru (IN); Priyanka Rao, Alpharetta, GA (US); Blake Browne, Fairfield, CT (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 18/775,564

(22) Filed: Jul. 17, 2024

(51) Int. Cl.
*G06F 40/186* (2020.01)
*G06Q 10/107* (2023.01)
*H04L 51/07* (2022.01)
*G06Q 30/0251* (2023.01)

(52) U.S. Cl.
CPC ............ *H04L 51/07* (2022.05); *G06F 40/186* (2020.01); *G06Q 10/107* (2013.01); *G06Q 30/0271* (2013.01)

(58) Field of Classification Search
CPC .............. G06Q 10/107; G06Q 30/0271; G06F 40/186; H04L 51/07
See application file for complete search history.

(56) References Cited

U.S. PATENT DOCUMENTS

| | | | | |
|---|---|---|---|---|
| 7,865,394 B1 * | 1/2011 | Calloway | ........... | G06Q 30/0603 705/14.66 |
| 8,572,496 B2 * | 10/2013 | Koopman | ............. | H04L 51/214 715/752 |
| 8,738,446 B1 * | 5/2014 | L'Heureux | ........ | G06Q 30/0256 705/14.54 |

(Continued)

FOREIGN PATENT DOCUMENTS

| | | | | |
|---|---|---|---|---|
| AU | 2011261220 A1 * | 1/2013 | ............... | G06F 3/00 |
| CN | 104954238 A   * | 9/2015 | | |

OTHER PUBLICATIONS

Cameron Robert; AMPscript Lesson 3: Dynamic Email Content using AMPscript in Salesforce Marketing Cloud; Jul. 26, 2023, Transcript attached; https://www.youtube.com/watch?v=aw8Dnwgz-N4 (Year: 2023).*

(Continued)

*Primary Examiner* — Benjamin Smith
(74) *Attorney, Agent, or Firm* — Leason Ellis LLP

(57) ABSTRACT

A computer-implemented method for incorporating dynamic data attributes in scalable communication. The method includes steps of creating an email template with placeholders for the dynamic data attributes, defining the dynamic data attributes, linking the email template to a campaign, setting a data source to be used for populating the placeholders with data, and populating the placeholders of the email with dynamic data at run time using the set data source.

7 Claims, 14 Drawing Sheets

(56) References Cited

U.S. PATENT DOCUMENTS

| | | | |
|---|---|---|---|
| 8,849,693 B1* | 9/2014 | Koyfman | G06Q 30/02 705/14.1 |
| 8,914,809 B1* | 12/2014 | Cohen | G06F 9/44 719/318 |
| 9,049,259 B2* | 6/2015 | Rathod | H04L 65/403 |
| 9,268,761 B2* | 2/2016 | Baldwin | G06T 11/001 |
| 9,508,060 B2* | 11/2016 | Jamison | H04L 51/18 |
| 10,140,619 B2* | 11/2018 | Tolompoiko | G06Q 30/0244 |
| 10,650,093 B2* | 5/2020 | Ganta | G06F 40/174 |
| 10,679,298 B2* | 6/2020 | Ehrhart | H04L 51/08 |
| 10,970,477 B1* | 4/2021 | Mohapatra | G06F 40/174 |
| 10,990,754 B2* | 4/2021 | Zhao | G06N 3/08 |
| 11,019,009 B2* | 5/2021 | Thies | G06F 40/143 |
| 11,244,021 B2* | 2/2022 | Wittke | G06F 16/957 |
| 11,252,119 B2* | 2/2022 | Waltz | H04L 51/42 |
| 11,270,340 B2* | 3/2022 | Knodel | G06N 20/00 |
| 11,361,144 B2* | 6/2022 | Mason | G06F 40/106 |
| 11,514,239 B1* | 11/2022 | Zagorac | G06F 40/186 |
| 11,741,119 B2* | 8/2023 | Orun | G06F 16/245 707/602 |
| 11,863,844 B2* | 1/2024 | Lyer | H04N 21/8133 |
| 11,874,865 B2* | 1/2024 | Singh | G06N 3/08 |
| 12,003,821 B2* | 6/2024 | Fidaleo | H04N 21/4722 |
| 2007/0260692 A1* | 11/2007 | Burgoyne | G06Q 10/107 709/206 |
| 2009/0089654 A1* | 4/2009 | Wittig | G06Q 10/107 715/223 |
| 2010/0070288 A1* | 3/2010 | Pandey | G06Q 30/0277 705/14.72 |
| 2010/0313119 A1* | 12/2010 | Baldwin | G06F 3/04842 715/256 |
| 2011/0265016 A1* | 10/2011 | Koopman | H04L 51/214 715/752 |
| 2012/0016736 A1* | 1/2012 | Tolompoiko | G06Q 30/02 705/14.43 |
| 2012/0042025 A1* | 2/2012 | Jamison | G06Q 30/0242 709/206 |
| 2012/0317038 A1* | 12/2012 | Erbey | G06Q 10/103 705/304 |
| 2013/0159840 A1* | 6/2013 | Nicolaescu | G06F 40/186 715/235 |
| 2014/0129942 A1* | 5/2014 | Rathod | H04N 21/44226 715/720 |
| 2014/0278940 A1* | 9/2014 | Wade | G06Q 30/0264 705/14.58 |
| 2015/0030151 A1 | 1/2015 | Bellini et al. | |
| 2015/0046555 A1* | 2/2015 | Cohen | G06Q 10/06 709/206 |
| 2015/0100432 A1* | 4/2015 | Shepherd | G06Q 30/0271 705/14.67 |
| 2015/0149884 A1* | 5/2015 | Wagner | G06F 40/154 715/234 |
| 2016/0104206 A1* | 4/2016 | Greenberg | G06Q 30/0277 705/14.73 |
| 2016/0162463 A1* | 6/2016 | Baldwin | G06T 11/001 715/234 |
| 2017/0006135 A1* | 1/2017 | Siebel | G06F 8/24 |
| 2017/0213242 A1* | 7/2017 | Sundaram | H04L 67/141 |
| 2017/0330285 A1* | 11/2017 | Ehrhart | G06Q 10/06 |
| 2018/0075008 A1* | 3/2018 | Ganta | H04L 51/04 |
| 2018/0191867 A1* | 7/2018 | Siebel | G06F 8/77 |
| 2019/0340654 A1* | 11/2019 | Samotin | G06Q 30/0276 |
| 2020/0027124 A1* | 1/2020 | Knodel | G06N 20/00 |
| 2020/0134009 A1* | 4/2020 | Zhao | G06N 3/044 |
| 2020/0153771 A1* | 5/2020 | Thies | H04L 51/08 |
| 2020/0228880 A1* | 7/2020 | Lyer | H04N 21/251 |
| 2020/0387936 A1* | 12/2020 | Estes | G06Q 30/0631 |
| 2021/0081227 A1 | 3/2021 | Verma et al. | |
| 2021/0174403 A1 | 6/2021 | Bellini et al. | |
| 2021/0329342 A1* | 10/2021 | Fidaleo | H04N 21/84 |
| 2022/0012299 A1* | 1/2022 | Wittke | G06F 16/9558 |
| 2022/0035988 A1* | 2/2022 | Mason | G06F 40/106 |
| 2022/0237202 A1* | 7/2022 | Orun | G06F 16/254 |
| 2022/0245541 A1 | 8/2022 | Minter et al. | |
| 2022/0366130 A1* | 11/2022 | Zagorac | G06F 3/0481 |
| 2023/0004711 A1* | 1/2023 | Bhatnagar | G06F 16/287 |
| 2023/0035505 A1* | 2/2023 | Olds | G06Q 30/0269 |
| 2023/0101224 A1* | 3/2023 | Singh | G06N 3/08 707/770 |
| 2023/0109946 A1* | 4/2023 | Minkel | G16H 20/00 705/2 |
| 2023/0113581 A1* | 4/2023 | Keating | G06Q 10/107 455/411 |
| 2023/0325589 A1* | 10/2023 | Roy | G06F 40/174 715/243 |
| 2024/0037322 A1* | 2/2024 | Tsabba | G10L 17/00 |
| 2024/0127292 A1* | 4/2024 | Estes | G06F 16/9535 |

OTHER PUBLICATIONS https://handlebarsjs.com; "What is Handlebars?"; 13 pages; Jul. 14, 2024; https://web.archive.org/web/20240715072016/https://handlebarsjs.com/guide/#what-is-handlebars (Year: 2024).*

* cited by examiner

TEMPLATE-BASED EMAIL
MNBA_ALG_ClientList_DDATable_DDALookup

CAMPAIGN
None

DETAILS  205

Location  Manager NBA  Move
Asset ID  79552
Customer Key  a908da9-9b66-44f3-902b-66aee1a5
Tags
Source Template  ManagerNBA.Publishing-Template-v
Template Location  ☐ CEM-Template
Owner  Priyanka Rao
Modified  October 7, 2022 3:51 PM by Priyank
Created Description  October 7, 2022 3:39 PM by Priyank Email ID  ⊙ 30528
Language  ⊙ utf-8

⊘ Not Shared

Subject: ALG Clients with Full Service Opportunities  _210_

Preheader:

You have \$ALGCount\$ ALGs with a Self Directed Opportunity. ⤶ _212_
Please see table below for more details:
\$TableContent\$ ⤶ _214_

DDA Configuration

232 ⌄ Manage DDA Attributes   234   236

| Structure | *Enter Column Name | *Select Data Type |
|---|---|---|
| Lookup | ALGCount | Text |
| Structure | *Enter Column Name | *Select Data Type |
| Table | ClientName | Text |
| Structure | *Enter Column Name | *Select Data Type |
| Table | OpportunityAmount | Currency |
| Structure | *Enter Column Name | *Select Data Type |
| Table | LeadAccountNumber | Numeric |

FIG. 2C

| | All ∨ | 🔍 Search Campaign and more... | |
|---|---|---|---|
| ⋮⋮⋮ CRM | Campaigns | ∨ 🏠 Home ∨ ○ Test_MNBA_Dec12 ○ Parent Campaign fo |

Campaign
Parent Campaign for DDA lookup and Table

| Status | Campaign Record type |
|---|---|
| Live | MNBA Parent |

∨ Campaign Description

| Campaign Name | Campaign Owner |
|---|---|
| Parent Campaign for DDA lookup and Table | ○ YOONK YOONK |
| Master ID | Content Block ID |
| Description | Target Audience |
| Parent Campaign for DDA lookup and Table | All Employee |
| Category | CAN-SPAM Classification |
| Test_MNBA_Dec12 | Transactional |
| Channel | Multivariant |
| Email | ☐ |
| Who can Send ⓘ | CRC Number |
| FA/CSA behalf of FA | 7617261 |

∨ Contact Eligibility

| Eligible for | Contacts Editable |
|---|---|
| All Employees | ☑ |

∨ Date Section

| Start Date | Start Date |
|---|---|
| 12/13/2022 | 12/30/2022 |
| Created By | CRC Expiration Date ⓘ |
| ○ YOONK YOONK 12/13/2022 9:42 AM | 12/30/2022 |

FIG. 2D

| Campaign Messages | | |
|---|---|---|
| CAMPAIGN SEND STATISTICS | | |
| Submitted: 0   Failed: 0 Rejected: 0   Waiting: 0 | | /242 |
| MESSAGE | CHANNEL | PREVIEW |
| MNDA_ALG_ClientList_DDaTable_DDALookup | Email | ALG Clients with Full Service Opportunities |

FIG. 2E

Connect Campaign

Select a journey for this campaign

Business Unit
[ MSQAD1 ]

Journey
[ MNBA_ALG_ClientList_DDATable_DDALookup  × ]

[Cancel] [Save]

FIG. 2F

| | | | | |
|---|---|---|---|---|
| | | All ✓ | 🔍 Search | |
| ⋮⋮ CRM | Campaigns | ✓ 🏠 Home ✓ | ○ Test_MNBA_Dec12 | ○ Test_MNBA_Dec12 |

◯ Campaign Field History 2

| Date | Field | User | Original Value | New Value | |
|---|---|---|---|---|---|
| 12/12/2022 9:40 AM | Status | VOONK YOONK | Draft | Live | ▽ |
| 12/12/2022 2:20 PM | Created | Morfesi Opipari | | | ▽ |

✉ Campaign Messages

CAMPAIGN SEND STATISTICS

Submitted: 0  Failed: 0
Rejected: 0  Waiting: 0

252

| MESSAGE | CHANNEL | PREVIEW |
|---|---|---|
| MNDA_ALG_ClientList_DDaTable_DDALookup | Email | ALG Clients with Full Service Opportunities |

📊 Campaign Metrics for the last 30 days (As of last business day)
ⓘ No Emails sent in the last 30 days Campaign Members

FIG. 2G

| Identify Worksheet and Columns | | | | | ☒ |
|---|---|---|---|---|---|
| File Uploaded: | DDA Table and Lookup for Prod Checkout 12-9 Copy.xlsx | | | | |
| Select worksheet from File: | Sheet 1 ▽  Refresh | | | | |

Step 2: Select Dynamic Data Attribute Columns
☑ Ignore Blank Rows     310     312

| Name | Column 1 | Column 2 | Column 3 | Column 4 | Column 5 |
|---|---|---|---|---|---|
| Step 1 | ✓ | ☑ | ☑ | ☑ | ☑ |
| Step 2 | MSID ▽ | ClientName ▽ | LeadAccount Number ▽ | Opportunity Amount ▽ | ALGCount ▽ |
| Name Row ▽ | MSID | ClientName | LeadAccount Number | Opportunity Amount | ALGCount |
| Data Row ▽ | 1C411 | Sabria Mehjabin | 799-12345-001 | $500,000 | 3 |
| Data Row ▽ | 1C411 | Kelsy Cadagin | 799-23456-001 | $1,000,000 | 3 |
| Data Row ▽ | 1C411 | Jimish Mody | 799-34567-001 | $2,000,000 | 3 |
| Data Row ▽ | O4WJK | Jimish Mody | 799-45678-001 | $2,000,000 | 3 |
| Data Row ▽ | O4WJK | Khubaib Farooq | 799-90123-001 | $800,000 | 3 |
| Data Row ▽ | O4WJK | Peiyanka Rao | 799-56789-001 | $9,000,000 | 3 |
| Data Row ▽ | 4F540 | Kristof Avay | 799-67890-001 | $1,200,000 | 3 |
| Data Row ▽ | 4F540 | Anindita Ghosh | 799-12379-001 | $1,500,000 | 3 |
| Data Row ▽ | 4F540 | Ashul Kumer | 799-98901-001 | $300,000 | 3 |
| Data Row ▽ | 02CLP | Mii Shah | 799-78901-001 | $700,000 | 3 |
| Data Row ▽ | 02CLP | Vishai Bhat | 799-98012-001 | $3,000,000 | 3 |
| Data Row ▽ | 02CLP | Ayush Mathur | 799-12345-001 | $500,000 | 3 |
| Data Row ▽ | 2B576 | Priyanka Rao | 799-24680-001 | $19,000,000 | 3 |
| Data Row ▽ | 2B576 | Radhika Kalla | 799-01234-001 | $2,500,000 | 3 |

302, 304, 306

[Continue] [Back] [Cancel]

FIG. 3A

| Select Datalake Query | | | | | | | |
|---|---|---|---|---|---|---|---|
| Search: | From: | To: | Status: Final ▽ | Auto Generated Query: No ▽ | Parameterized Query: No ▽ | | |
| Query Purpose DDA ▽ | | Query Type User AdHoc ▽ | | Apply | Reset Filters | Cancel | |
| Results per Page 10 ▽ | | | | | ◁ Page 1 of 3 ▷ | | |
| Action | # | SHORT DESCRIPTION | FILE NAME | QUERY PURPOSE | QUERY TYPE | PARAMET QUERY | AUTOGEN |
| Select | 36683 | DDA DLBT Query QA07 | DDA_User_12_17.hql | DDA | User Adhoc | No | No |
| Select | 36632 | MNBA_DDA_TABLE_TE | MNBA_DDA_TABLE_T | DDA | User Adhoc | No | No |
| Select | 24710 | Checking_onboarding_D | DDA_User_09_16.hql | DDA | User Adhoc | No | No |
| Select | 23819 | Checking_onboarding_D | DDA_User_08_22.hql | DDA | User Adhoc | No | No |
| Select | 16359 | Query checking for DDA qa07 | DDA_User_regression_ | DDA | User Adhoc | No | No |
| Select | 14771 | Checking the DDA user r | DDA_User_regression | DDA | User Adhoc | No | No |
| Select | 11687 | Lifenavigator_DDA_PRO | Lifenavigator_DDA_PF | DDA | User Adhoc | No | No |
| Select | 10372 | MBS_DDA_Query_UPDA | MBS_DDA_Query_UP | DDA | User Adhoc | No | No |
| Select | 10367 | MUNI_DDAQuery_new_l | MUNI_DDAQuery_new | DDA | User Adhoc | No | No |
| Select | 10366 | Corp_DDA_new_UPDAT | Corp_DDA_new_UPD| DDA | User Adhoc | No | No |

⚠ This campaign has dynamic data attributes that will be unique to each recipient. These are indicated in the body of the email as \$---\$ text placeholders below and are not editable Subject * ALG Clients with Full Service Opportunities

[Greeting]
Preferred Name    Font: Calibri   Size: 15

Introduction
Add/Update    332

You have \SALGCount\$ ALGs with a Self Directed Opportunity:
Please see table below for more details:

\TableContents\$

334

330

Conclusion
Add/Update

FIG. 3C

Send a Manager NBA | Step 2: Add/ Remove Contacts

345

| Rule | Region | Complex | Branch |
|------|--------|---------|--------|
| ALL  | ALL    | ALL     | ALL    |

Q Search

☑ Contacts Selected: 3 | Reset Selections

Viewing 1-10 of 10  < Pg 1 of 1 ∨ >

| EMPLOYEE NAME | PREFERRED NAME | JOB DESCRIPTION | CAMPAIGN STATUS | REGION | COMPLEX | BRANCH NAME | FROM | TOTAL ASSETS | TOTAL T12 PRODUCTION | LAST MNBA EMAIL DATE | #MNBA Emails (Last) |
|---|---|---|---|---|---|---|---|---|---|---|---|
| ☐ Arvay, Krist | Kristof ar | Sr Manager,Fir | Eligable | MULTIPI | MULTIPI | MULTIPI | Mehjab ∕ | - | - | 01/04/2023 | |
| ☑ Farooq, Kh | Khubaib1 | Sr Manager,Fir | Eligable | MULTIPI | MULTIPI | MULTIPI | Mehjab ∕ | - | - | - | |
| ☑ Kaila, Radr | Radhika | Sr Manager,Fir | Eligable | MULTIPI | MULTIPI | MULTIPI | Mehjab ∕ | - | - | 12/29/2022 | |
| ☐ Karbowsky, | Kelsey | Sr Manager,Fir | Eligable | MULTIPI | MULTIPI | MULTIPI | Mehjab ∕ | - | - | - | |
| ☐ Kondeboin: | Lakshuma | Sr Manager,Fir | Eligable | MULTIPI | MULTIPI | MULTIPI | Mehjab ∕ | - | - | 01/24/2023 | |
| ☐ Kumar, Pra | Pranam | Sr Manager,Fir | Eligable | MULTIPI | MULTIPI | MULTIPI | Mehjab ∕ | - | - | - | |
| ☐ Mathur, Ayı | Ayush | Sr Manager,Fir | Eligable | MULTIPI | MULTIPI | MULTIPI | Mehjab ∕ | - | - | 01/24/2023 | |
| ☑ Mehabin, S | SabiraTest | Sr Manager,Fir | Eligable | MULTIPI | MULTIPI | MULTIPI | Mehjab ∕ | - | - | 01/24/2023 | |
| ☐ Parower, C | Crosser | | Eligible | MULTIPI | MULTIPI | MULTIPI | Mehjab ∕ | - | - | - | |
| ☐ Pirintea, Sei | Sengel | Vice President | Eligable | MULTIPI | MULTIPI | MULTIPI | Mehjab ∕ | - | - | - | |

| Send a Manager NBA | Step 3: Preview/Summary |

Subject: ALG Clients with Full Service Opportunities Khubiab1

You have 3 ALGs with a Self Directed Opportunity. Please see table for more details:

| Client Name | Lead Account Number | Opportunity Amount |
|---|---|---|
| Kristof Arvay | 799-56789-001 | $1,200,000 |
| Navya | 799-13579-001 | $300,000 |
| Anindita Ghosh | 799-67890-001 | $1,500,000 |

Sabira Mehjabin, Associate
Morgan, Morgan
Phone +1 404 486-1622
Sabira.mehjabin@morganmorgan.com

ADD CC/BCC

Recipients (3) /352

Farooq, Khubaib - MULTIPLE (4F540) ✕

Kalla, Redhika - MULTIPLE (2B676) ✕

Mehjabin, Sabira - MULTIPLE (1C411) ✕

(354 references the table)

FIG. 3E

| Send a Manager NBA | Step 3: Preview/Summary |

Subject: ALG Clients with Full Service Opportunities Khubiab1

You have 3 ALGs with a Self Directed Opportunity. Please see table for more details:

| Client Name | Lead Account Number | Opportunity Amount |
|---|---|---|
| Sabira, Mehjabin | 799-12345-001 | $500,000 |
| Jimish Mody | 799-34567-001 | $2,000,000 |
| Kelsey Cadagin | 799-23456-001 | $1,000,000 |

Sabira Mehjabin, Associate
Morgan, Morgan
Phone +1 404 486-1622
Sabira.mehjabin@morganmorgan.com

ADD CC/BCC

Recipients (3)

Farooq, Khubaib - MULTIPLE (4F540) ✕

Kalla, Redhika - MULTIPLE (2B676) ✕

Mehjabin, Sabira - MULTIPLE (1C411) ✕

{{.dataobject JsonVar type-variable source-@json maxrows-20}} {{.data}} {"target":"@Json"}
{{/data}}{{dataobject}}{{≠eachJsonVar}} %%[ Set @ClientName=TreatAsContent('{{ClientName}}')Set
@LeadAccountNumber=TreatAsContent('{{LeadAccountNumber}}')Set
@OpportunityAmount=TreatAsContent('{{OpportunityAmount}}')Set@ALGCount=TreatAsContent('{{ALG
Count}}')]%%{{/each}}
You have%%=v@ALGCount}=%%ALGs with a SelfDirected Opportunity.
Please see table below for more details:

%%[Set@tableData ="
"]%% {{.dataobject JsonVar type=variable source=@json maxrows=20}} {{.data}} {"target":@Json"}
{{data}}{{/dataobject}} {{#each Json Var}} %%[Set @tableJsonData =
TreatAsContent9('{{TableContent}}')]%%{{/each}} {{.dataobject JsonVar type=variable
maxrows=200}} {{.data}} {"target":"@tableJsonData"} {{/data}} {{/dataobject}} {{#each JsonVar}} %% [Set
@ClientNameArray=TreatAsContent('{{JsonVar.ClientName}}')
Set@ClientNameItems=
BuildRowsetFromString(@ClientNameArray,'ll')Set@LeadAccountNumberArray=
TreatAsContent('{{JasonVar.LeadAccountNumber}}')
Set@LeadAccountNumberItems = BuildRowsetFromString@LeadAccountNumberArray,'ll')Set
@OpportAmountArray=TreatAsContent('{{JsonVar.OpportunityAmount}}')Set@OpportunityAmountItems=
BuildRowSetFromString@ClientNameArray,'ll')Set@LeadAccountNumberArray=TreatAsContent('{{JsonVar.
LeadAccountNumber}})'
Set@LeadAccountNumberItems = BuildRowsctFromString@LeadAccountNumberArray,'ll') Sct
@OpportunityAmountArray=TreatAsContent('{{JsonVar.OpportunityAmount}}')Set @
OpportunityAmountItems=BuildRowSetFromString@OpportunityAmountArray,'ll')for @tabledataCount) = 1)
to Rowecount@ClientNameItems) do set @ClientName - (Field Row(@ClientNameItems, @tabledataCount),
1) Set @LeadAccountNumber=
Field(Row(@LeadAccountNumberItems, @tabledataCount),1) (Set@OpportunityAmount =
Field(Row@OpportunityAmountItems, @tableDataCount), 1)Set@tableData = concat@tableData, =
concat@tableData, )"","") next@tabledataCount]%%{{/each}}%%[Set@tableData = concat@tableData, "

| Client Name | Lead Account Number | Opportunity Amount |
|---|---|---|
| ",@ClientName," | ",@LeadAccountNumber," | ",@OpportunityAmount," |

")]%%%=V@tableData)=%%=

FIG. 4

ALG Clients with Full Service Opportunities

Mehjabin, Sabira (AD&I - STRAT, ARCH & PLATFORMS)
To ○ Mehjabin, Sabira (AD&I - ARCH & PLATFORMS)

Sabira,

You have 3 ALGs with a Self Directed Opportunity.
Please see table for more details:

| Client Name | Lead Account Number | Opportunity Amount |
|---|---|---|
| Sabira, Mehjabin | 799-12345-001 | $500,000 |
| Kelsey Cadagin | 799-23456-001 | $1,000,000 |
| Jimish Mody | 799-34567-001 | $2,000,000 |

METHOD AND SYSTEM FOR INCORPORATING DYNAMIC DATA ATTRIBUTES IN SCALABLE EMAIL COMMUNICATIONS

FIELD OF THE DISCLOSURE

The present disclosure relates to data processing, and more particularly, relates to a method and system for incorporating dynamic data structures in scalable communications.

BACKGROUND OF THE DISCLOSURE

There is a need in many organizations for tools that enable productive engagement, that is more efficient means of internal and external communication. One of the ways productive engagement can be enhanced is by communicating at scale to minimize repetitive personalized communications. While various means of bulk and automated communications have been deployed, they have been limited in their abilities to incorporate dynamic features which personalize the communications and convey important data in a scalable manner. This lack is particularly felt by managers who may wish to send personalized communications to delegates at scale.

It would therefore be advantageous to provide a solution that enables users, such as managers,

SUMMARY OF THE DISCLOSURE

The present disclosure describes a computer-implemented method for incorporating dynamic data attributes in scalable communication. The method includes steps of creating an email template with placeholders for the dynamic data attributes, defining the dynamic data attributes, linking the email template to a campaign, setting a data source to be used for populating the placeholders with data, and populating the placeholders of the email with dynamic data at run time using the set data source.

These and other aspects, features, and advantages can be appreciated from the following description of certain embodiments and the accompanying drawing figures and claims.

BRIEF DESCRIPTION OF THE DRAWINGS

FIG. 2A is an embodiment of a user interface screen for creating an email template for a campaign according to the present disclosure.

FIG. 2B is an exemplary user interface screen that enables users to provide data regarding the campaign and set user access to the campaign.

FIG. 2C is an exemplary interface screen for performing configuration of dynamic data attributes according to the present disclosure.

FIG. 2D is an exemplary user interface screen that enables a user to create a parent campaign.

FIG. 2E is an exemplary user interface screen that enables a user to define a journey for campaign communications.

FIG. 2F is an exemplary user interface screen for journey/campaign linking.

FIG. 2G is an exemplary user interface screen for displaying parent campaign details.

FIG. 3A is an exemplary user interface screen that enables a user to define DDA attributes in columns of a table.

FIG. 3B is an exemplary user interface screen that enables a user to select specific queries and to allow a set of users to view the idea.

FIG. 3C is an exemplary user interface screen that enables users to select content for campaign communications using dynamic data attributes.

FIG. 3D is an exemplary user interface screen that provides functionality for adding or removing participants from campaign communications.

FIG. 3E is an example preview screen for viewing dynamic data inserted into a campaign communication for a first recipient.

FIG. 3F is an example preview screen for viewing dynamic data inserted into a campaign communication for a second recipient.

FIG. 4 shows an example of script code used to personalize communications of a campaign using dynamic data attributes according to the present disclosure.

DESCRIPTION OF CERTAIN EMBODIMENTS OF THE DISCLOSURE

The systems and methods described herein provide a platform that enables users to streamline digital engagement by configuring content to share with internal or external parties in a scalable manner. Users have the option to use pre-written content or create their own content. Content is personalized to communicants by incorporating dynamic data attributes (DDAs) into the content, which is replaced with specific data at run time. Dynamic Data Attributes (DDAs) as defined herein are custom data points that are inserted into campaign communications according to the unique attributes of each recipient. The attributes themselves can include a range of information and formats including alphanumeric data (e.g., recipient names) and tabular data. The system generates a codex automatically once the configuration of data attributes is defined for lookup or tabular format. The configuration can be used for any other content, which has the same data attributes. These measures save a great deal of development time.

Figure 1:
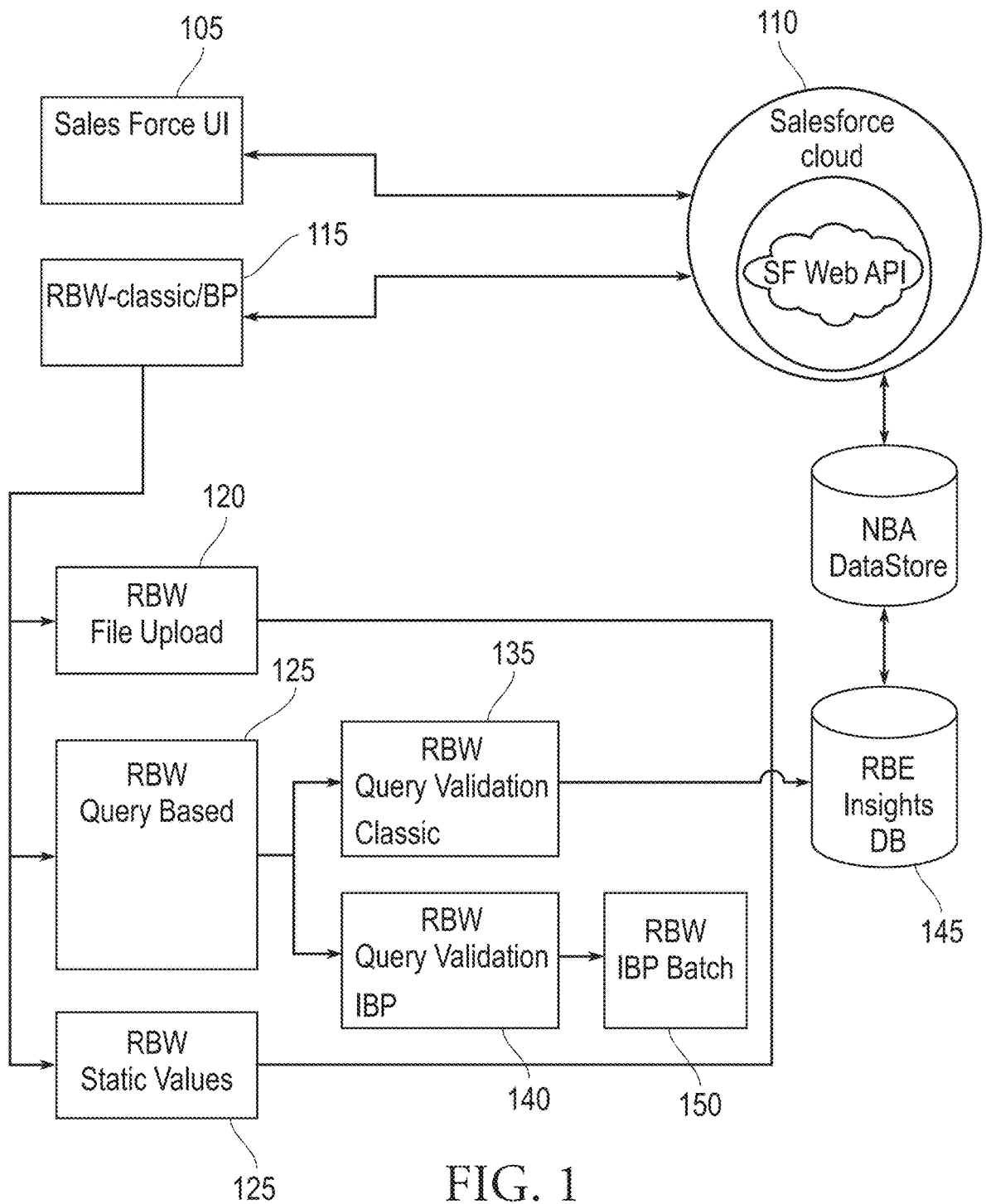
FIG. 1 is a schematic diagram of a block diagram of an embodiment of a system and flow for incorporating dynamic data attributes in scalable communications according to the present disclosure.

The following text refers to the block diagram of an embodiment of a system 100 for incorporating dynamic data attributes in scalable communications shown in FIG. 1 as well as the user interface screens shown in FIGS. 2A-3F. Starting with FIG. 1, a customer relationship management (CRM) application 105 is configured to provide a user interface that enables a user to perform several tasks including, but not limited, to creating a "campaign" and creating an email template for the campaign. In addition, the CRM application 105 enables users to set up dynamic data attributes (DDA) in the template. A campaign is a concerted plan, typically for targeting customers in a specific way. The CRM application 105 enables the user to create a campaign in an automated manner based on selected content theme from which idea objects and associated placeholders (e.g., opportunity, rule, target audience) are generated using database queries. Custom campaigns can also be generated using templates for selecting idea objects. To incorporate DDA attributes, the campaign type can be selected as "Category".

Once a campaign is created, the user can create an email template for the campaign using the interface shown in FIG. 2A. The email template constitutes an "idea" for the campaign as it is one of the deliveries to be used in a campaign. The email template is designed using placeholders defined when the campaign is created. As shown, the email template interface includes a details (metadata) section 205 and a template section 210. In the template section 210 placeholders 212, 214 are shown in the example email. For example, certain placeholder 212 (\$ALGCount\$) is a "lookup" type of placeholder which is named based on the data to be looked up in a data store. The "\$" allows the pertinent script (e.g., AMPscript) to recognize the placeholder at run time. Placeholder 214 is a "table" type of structure, which is indicated as "tableContent" in the email template.

Referring again to FIG. 1, once a campaign and email template have been created with DDA attributes, the campaign and email template data are uploaded by the CRM application 105 to a CRM cloud platform 110 having a Web application program interface (WebAPI). By uploading to the cloud platform 110 the data becomes easily accessible at scale in real time. After uploading, a publishing application 115 is executed through which users can link the campaign to a platform and define the dynamic data attributes.

Figure 2B:
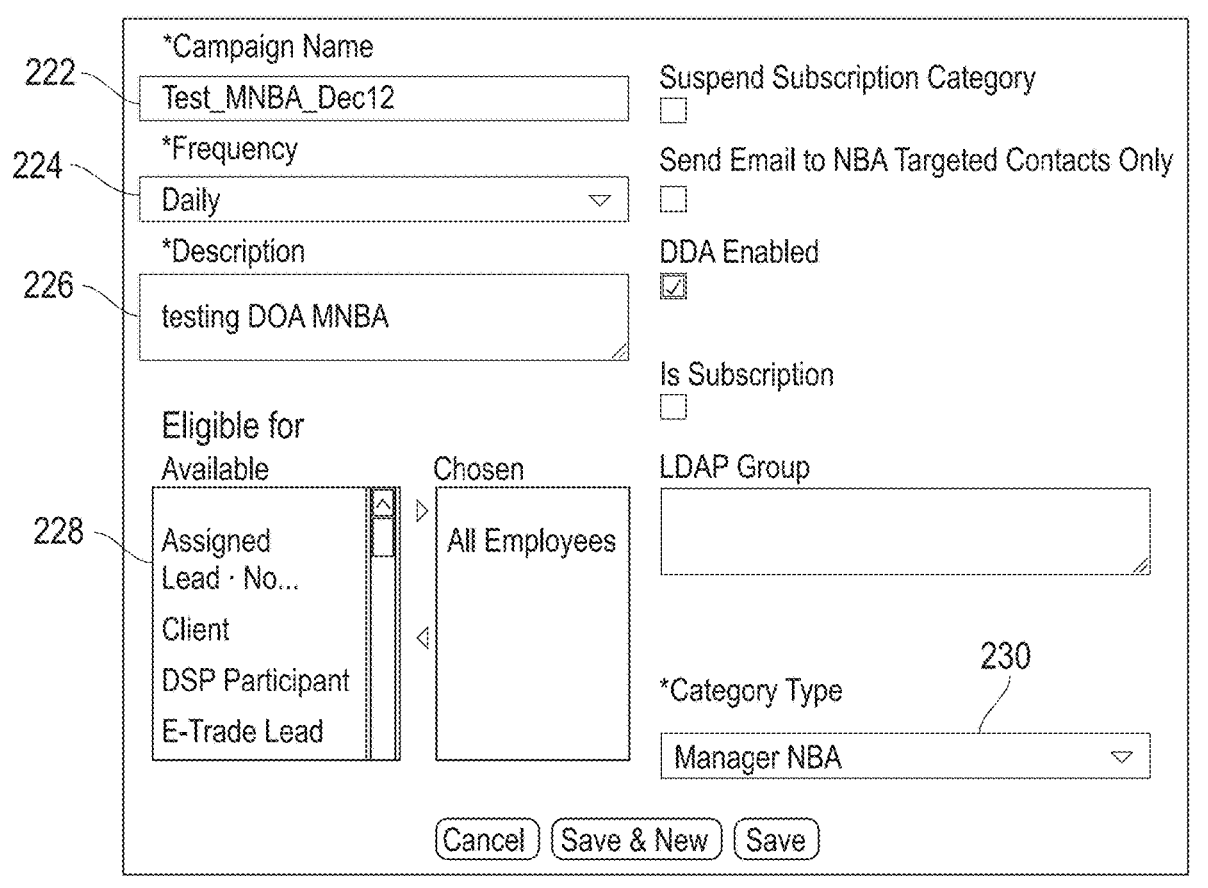

FIG. 2B shows an example user interface that enables users to provide data regarding the campaign and set user access to the campaign. Fields that can be set in this interface include the campaign name 222, campaign frequency 224 (i.e., how often communications are published for the campaign), campaign description 226, users eligible for access to the campaign 228, and a campaign category type 230. The campaign category type is typically set according to correspond to the engagement application, thereby linking the campaign with the application. In order to use DDAs for the campaign, the user checks a box to enable DDA (not shown).

The publishing application 115 provides the user with the ability to configure the DDAs that will be incorporated in the campaign. FIG. 2C is an interface screen for performing such configuration. As shown, there are three types of data that the user can configure: a DDA structure 232, DDA column names 234, and a DDA data type 236. These three items are defined for each dynamic attribute. The DDA structure 232 indicates whether the attribute is a lookup, table, or other structure type. The DDA column name indicates the data that will be displayed in the email. In the example shown, the column name includes data items such as "ALG count" and "client name". These column names should match the corresponding data names in a data store such as a datalake, or in a file upload depending on which method is used to publishing the idea. As shown, an idea can include both lookup and table attributes. The DDA data type 236 indicates whether the data is in text, numeric or other form. At the bottom of FIG. 2C a code section 240 is shown which includes script code that is generated according to the selected attributes.

After DDAs have been defined, the next step in the process is creating a parent campaign. An interface for performing this step is shown in FIG. 2D. As shown, the user can enter details of the parent campaign through the interface, including the parent campaign name, description, category, etc. By this step the associated category has been marked as DDA enabled, and the DDA configurations have been set. The publishing application 115 can then use the defined parent campaign to display the DDAs. FIG. 2E shows an interface for defining a "journey", which is a communication plan for a campaign, including a communication channel. In the example shown, the journey defines the message 242 used in the communication, in this case "ALG_ClientList_DDATable_DDA_Lookup". The channel 244 is defined as "email" which links the journey to an email. Following the definition of the journey, the journey is then linked to a campaign. An interface for the journey/campaign linking is shown in FIG. 2F. In the example shown, the journey ALG_ClientList_DDATable_DDA_Lookup is being linked with campaign labeled MSQA01. Once linked, users will be able to see this change in parent campaign details interface display shown in FIG. 2G. The interface display of FIG. 2G shows the campaign message 252 that was linked to an email in the previous step. Other campaign information including campaign field history 254 and campaign metrics are also shown.

When creating a file-based DDA idea, the source file includes intended recipients and their associated DDA attributes. The source file indicates the data to display in lieu of the placeholders for each selected recipient. As an example, in Table 1 below, a source file includes data for three client records with associated data.

TABLE I

| ID | Client Name | Team contact # | Opportunity Amt | ALG count |
|---|---|---|---|---|
| 1C411 | Sunita Mehjabin | 799-12345-001 | $500,000 | 3 |
| 1C411 | Kelly Cadagin | 799-23456-001 | $1,000,000 | 3 |
| 1C411 | Ashwin Sarma | 799-34567-001 | $2,000,000 | 3 |

Data Lake Based Targeting (DLBT) queries (as opposed to file-based DDA ideas) include a DDA query which indicates the DDA attributes and intended recipients and a targeting query which indicates the users eligible to display the idea. An example DLBT query is shown directly below.

select num_emp as MSID,
    nme_1st as ClientALGName,
    txt_emp_sta as LeadAccountNumber,
    dt2_snap_xpir as OpportunityAmount,
    5 as ALGCount
    from dcp_dlbt_view_db.vemployee_can where num_emp in ('02CPL', '64WCG', '04WJK', '1C411', '4F540')

Referring again to FIG. 1, using the publishing application 115, a new rule can be added by selecting "File Upload" 120 and uploading the file containing the dynamic data. The user can select the appearance of the data in a table, such as by indicating name rows (which contain the titles of attribute categories) vs. data row (which contain attribute data). Similarly, for DLBT queries 125, the user can select an appropriate targeting query from a popup screen to indicate which users will be able to view the idea. The dynamic attributes feature is used to link the appropriate DDA query. This will provide the data inputs for the dynamic attributes in the parent campaign. In certain cases, the content value is static across all accounts and the user can select to place in a static value 130 instead of a query. DLBT queries are validated 135 and stored in a database 145, but for batch processing, DLBT queries are validated with placeholder sample values and stored in the database 145 for batch processing. At run time, the publishing application the dynamic data is inserted into placeholders and the results are also stored in database 145.

In the first instance (file upload), once a parent campaign and targeted user (e.g., client) have been selected and the file containing the dynamic data has been uploaded, the user can use the interface screen shown in FIG. 3A to define DDA attributes in columns of a table. In FIG. 3A, the user can check off all columns that contain DDAs and can use the drop-down control for each column to connect the columns to a selected attribute. In particular, FIG. 3A shows a DDA table for the file "DDA Table and Lookup for Prod Checkout." The table includes a name row 302, data rows e.g., 304, 306. As examples of DDA data, column 310 includes data for attribute "Client Name" while column 312 includes data for attribute "Opportunity Amount." FIG. 3B shows a user interface screen that allows users to select specific queries e.g., 322, 324 for enabling a set of users to view the idea. In certain implementations, file-upload DDAs and DLBT-based DDAs are supported on an overnight or intraday basis for batch runs.

FIG. 3C is an exemplary user interface screen that enables users to select content for campaign communications using DDAs. The interface screen includes a text editor 330 that enables the users to view template contents of an email communication. As shown, within the text editor, the interface displays placeholders 332, 334 for DDA values indicated by "/$[DDA Attribute]$/". In some embodiments, the text editor does not permit edits to the body of the email to prevent deletion or alteration to the DDA placeholders. However, in such embodiments, the user can add certain custom content such as an introduction or conclusion.

After setting the communication content with DDAs added, the user has the option to add or remove intended recipients of the communication. FIG. 3D is an exemplary user interface screen that provides this functionality. Each campaign initially includes a list of intended recipients 340 based on the file upload or DLBT query. The user can remove contact from the list by checking boxes, e.g., 342, 344 next to named contact entries. A search bar 345 can be used to search for and then add additional contacts.

After the user has selected their desired recipient a preview screen can be displayed which shows the campaign with the dynamic data inserted, as shown in FIGS. 3E and 3F. The placeholders that are shown in FIG. 3D are replaced by actual data that has been pulled from the file upload or the DLBT query. As the user clicks through different recipients in the preview screen, different data points are displayed. For example, FIG. 3E shows data for a first recipient 352 which is reflected in the body of the first preview screen which contains a table 354 with dynamic data specific to the first recipient. When the user selects a second recipient 356 the screen is switched to the view shown in FIG. 3F and the data table 358 (and other aspects of the email such as the addressee) changes accordingly.

Figure 5:
FIG. 5 is an example of an email that the recipient receives, including the dynamic data content specific to the recipient according to the present disclosure.

At run time, the publishing application generates a code (e.g., Ampscript code) for a campaign. A file 360, such as shown in FIG. 4, is created at runtime for various types of campaigns which is mapped to a particular campaign category. The script code personalizes all of the emails of the campaign using DDAs at run time. This code is generated on basis of data attributes created and setup as "Table" or "Lookup". The codex generation logic is very generic in nature and can generate code for any number of data attributes defined. In some implementations, it supports "Table structure", which shows email content in a table structure and "LookUP". Once the user is satisfied with the previews and is ready to send, the content can be submitted for publication. In some implementations, a warning message can appear in the user interface that they are about to send an idea that contains DDAs as a reminder to confirm the accuracy of the data. Upon confirmation, the email communications are sent to the selected recipients. FIG. 5 is an example of an email that the recipient receives, including the dynamic data content specific to the recipient.

The system and methods for incorporating dynamic data attributes in scalable communication described above allows users to send personalized emails to varying numbers of recipients with minimal user effort (e.g., a few clicks). In addition, the system and method allow managers to communicate to recipients at scale in a customized manner.

The methods and processes described herein are performed by multiple computing devices (e.g., user devices, physical servers, workstations, storage arrays, cloud computing resources, etc.) that communicate and interoperate over one or more networks to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices can be, but need not be, co-located. The results of the disclosed methods and tasks can be persistently stored by transforming physical storage devices, such as solid-state memory chips or magnetic disks, into a different state. In some embodiments, the computer system may be a cloud-based computing system whose processing resources are shared by multiple distinct business entities or other users.

The methods described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium.

The modules described herein which are executed on one or more computing devices and information processors which can communicate with other information processors within the organization and outside of the organization using data connections over a data network. Data connections can be any known arrangement for wired (e.g., high-speed fiber) or wireless data communication, using any suitable communication protocol, as known in the art.

It is to be understood that any structural and functional details disclosed herein are not to be interpreted as limiting the systems and methods, but rather are provided as a representative embodiment and/or arrangement for teaching one skilled in the art one or more ways to implement the methods.

It is to be further understood that like numerals in the drawings represent like elements through the several figures, and that not all components and/or steps described and illustrated with reference to the figures are required for all embodiments or arrangements.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

While the disclosure has been described with reference to exemplary embodiments, it will be understood by those skilled in the art that various changes may be made and equivalents may be substituted for elements thereof without departing from the scope of the disclosed invention. In addition, many modifications will be appreciated by those skilled in the art to adapt a particular instrument, situation or material to the teachings of the disclosure without departing from the essential scope thereof. Therefore, it is intended that the invention not be limited to the particular embodiment disclosed as the best mode contemplated for carrying out this invention, but that the invention includes all embodiments falling within the scope of the appended claims.

What is claimed is:

1. A computer-implemented method for incorporating dynamic data attributes in scalable communication comprising:
    creating an email template with generic placeholders for dynamic data attributes;
    defining the dynamic data attributes using a user interface, wherein the dynamic data attributes comprise a structure, a data source name, and a data type, and wherein the structure of the dynamic data attribute indicates a structure of underlying sourced data comprising at least one of a lookup, a table and another sourced data structure;
    linking the email template to a campaign;
    setting a data source to be used for populating the placeholders with data, in accordance with the data source name of the dynamic data attributes;
    automatically generating an email file with script code embedded for personalizing the placeholders in all emails of a campaign using the defined dynamic data attributes at run time for the campaign and end users; and
    executing the script code to populate the placeholders of the emails of the campaign with dynamic data based on the dynamic data attributes at run time using the set data source,
    wherein the locations and content of the placeholders are modifiable at run time by an end user via the user interface prior to being populated, and a second script code is automatically generated to reflect any modifications to the locations and content of the placeholders by the end user at run time immediately before the emails of the campaign are generated and transmitted, and
    wherein the data source constitutes one or more datalake-based targeting queries for each of the dynamic data attributes.

2. The computer-implemented method of claim 1, wherein the data source is a file upload.

3. The computer-implemented method of claim 1, further comprising defining a journey communication plan for the linked campaign.

4. The computer-implemented method of claim 1, wherein the dynamic data attributes have a structure type, and the structure type is one of lookup, table, or other structure type.

5. The computer-implemented method of claim 1, further comprising uploading the email template and campaign to a cloud platform prior to populating the placeholders of the email with dynamic data at run time using the set data source.

6. The computer-implemented method of claim 1, further comprising:
    presenting a user interface screen through which a user can enter a structure column names and a data type for the dynamic data attributes.

7. A non-transitory computer-readable medium for incorporating dynamic data attributes in scalable communication comprising instructions stored thereon, that when executed on a processor, perform the steps of:
    creating an email template with generic placeholders for dynamic data attributes;
    defining the dynamic data attributes using a user interface, wherein the dynamic data attributes comprise a structure, a data source name, and a data type, and wherein the structure of the dynamic data attribute indicates a structure of underlying sourced data comprising at least one of a lookup, a table and another sourced data structure;
    linking the email template to a campaign;
    setting a data source to be used for populating the placeholders with data, in accordance with the data source name of the dynamic data attributes;
    automatically generating an email file with script code embedded for personalizing the placeholders in all emails of a campaign using the defined dynamic data attributes at run time for the campaign and end users; and
    executing the script code to populate the placeholders of the emails of the campaign with dynamic data based on the dynamic data attributes at run time using the set data source,
    wherein the locations and content of the placeholders are modifiable at run time by an end user via the user interface prior to being populated, and a second script code is automatically generated to reflect any modifications to the locations and content of the placeholders by the end user at run time immediately before the emails of the campaign are generated and transmitted, and
    wherein the data source constitutes one or more datalake-based targeting queries for each of the dynamic data attributes.

* * * * *